(12) United States Patent
Matsuda et al.

(10) Patent No.: US 7,584,564 B2
(45) Date of Patent: Sep. 8, 2009

(54) INTERNALLY ILLUMINATED SIGN

(75) Inventors: Akihiro Matsuda, Uozu (JP); Yutaka Hamada, Namerikawa (JP); Ikuo Mimura, Uozu (JP)

(73) Assignee: Nippon Carbide Kogyo Kabushiki Kaisha, Tokyo (JP)

( * ) Notice: Subject to any disclaimer, the term of this patent is extended or adjusted under 35 U.S.C. 154(b) by 590 days.

(21) Appl. No.: 10/519,748

(22) PCT Filed: Jul. 7, 2003

(86) PCT No.: PCT/JP03/08597

§ 371 (c)(1),
(2), (4) Date: Dec. 29, 2004

(87) PCT Pub. No.: WO2004/006216

PCT Pub. Date: Jan. 15, 2004

(65) Prior Publication Data

US 2006/0021267 A1     Feb. 2, 2006

(30) Foreign Application Priority Data

Jul. 8, 2002     (JP)     ............................. 2002-198371

(51) Int. Cl.
  *G09F 19/00*     (2006.01)
(52) U.S. Cl. ........................................ 40/615; 359/530
(58) Field of Classification Search .................. 40/612, 40/615; 359/528, 530; 362/145
   See application file for complete search history.

(56) References Cited

U.S. PATENT DOCUMENTS

| | | | |
|---|---|---|---|
| 3,830,682 A | 8/1974 | Rowland | ........................ 161/2 |
| 4,005,538 A * | 2/1977 | Tung | ............................ 40/564 |
| 4,025,159 A | 5/1977 | McGrath | ..................... 350/105 |
| 4,618,518 A * | 10/1986 | Pricone et al. | ............. 428/41.5 |
| 4,952,023 A | 8/1990 | Bradshaw et al. | ........... 350/102 |
| 5,122,902 A | 6/1992 | Benson | ........................ 359/529 |
| 5,387,458 A | 2/1995 | Pavelka et al. | .............. 428/141 |
| 5,605,761 A | 2/1997 | Burns et al. | ................. 428/412 |
| 5,672,643 A | 9/1997 | Burns et al. | ................... 524/90 |
| 6,083,607 A | 7/2000 | Mimura et al. | .............. 428/167 |
| 6,685,323 B1 | 2/2004 | Mimura et al. | .............. 359/530 |
| 2003/0100637 A1 | 5/2003 | Mimura et al. | ................ 524/89 |
| 2005/0018292 A1 | 1/2005 | Mimura et al. | .............. 359/529 |

FOREIGN PATENT DOCUMENTS

| | | |
|---|---|---|
| EP | 0 333 502 | 9/1994 |
| EP | 1 136 847 | 9/2001 |
| JP | 9-291280 | 11/1997 |
| JP | 10-261312 | 9/1998 |
| WO | WO 98/53348 | 11/1998 |
| WO | WO 99/04604 | 1/1999 |

* cited by examiner

*Primary Examiner*—Joanne Silbermann
(74) *Attorney, Agent, or Firm*—Fitzpatrick, Cella, Harper & Scinto

(57) ABSTRACT

The invention provides an internally illuminated sign comprising an information display section having at least one flat or curved surface which retroreflects light coming from the front of said sign and transmits light from the interior of said sign; an illuminator disposed behind the information display section; and a housing which encloses and holds said information display section and the illuminator. Those retroreflective elements used in said information display section are prismatic retroreflective elements according to the principle of total internal reflection, a large number of which are densely arranged to form a continuous retroreflective plane, at least the retroreflecting area of the back of said large number of prismatic retroreflective elements has no bonded area to other layer(s).

9 Claims, 7 Drawing Sheets

(A)

(B)

(A)

(B)

(A)

(B)

INTERNALLY ILLUMINATED SIGN

TECHNICAL FIELD

This invention relates to an internally illuminated sign of novel construction, which comprises an information display section having a surface which retroreflects light coming from the front of the sign and transmits light coming from the interior of the sign, an illuminator disposed on the back of said display section; and a housing enclosing and holding these information display section and illuminator.

More particularly, the invention relates to a retroreflective, internally illuminated sign which comprises an information display section having at least one flat or curved surface which retroreflects light coming from the front of the sign and transmits light from the interior of the sign; an illuminator disposed on the back of the information display section; and a housing enclosing and holding these information display section and illuminator, and which is characterized in that the retroreflective element used in said information display section is a prismatic retroreflective element in accordance with the principle of total internal reflection, a large number of said prismatic retroreflective elements are disposed in closest contact with each other to form a continuous retroreflective plane, and at least the retroreflective area on the back of said large number of prismatic retroreflective elements has no bonded portion with other layers.

BACKGROUND ART

An internally illuminated sign comprising an information display section having at least one flat or curved surface which retroreflects the light coming from the front of the sign and transmits the light coming from the interior of the sign; an illuminator disposed on the back of said display section; and a housing enclosing and holding these information display section and illuminator is known.

For example, Japanese Patent Publication (Laid-open) 1 (1989)-298395-A (U.S. Pat. No. 4,952,023) to Bradshaw, et al. has disclosed:

"an internally illuminated sign comprising an enclosure transmissive to light on at least one side, designated the front side, and cube corner retroreflective sheeting positioned to reflect light incident on the front of the sign, wherein the cube corner retroreflective sheeting:

(1) comprises a cover layer having a multiplicity of retroreflective cube corner members and a base layer of transparent material partially bonded to the cover layer, and (2) has areas, where the base layer has been bonded to the cover layer, which are:

(a) optically transparent to internal light with an angle of incidence greater than or equal to zero degrees and less than 90 degrees, (b) interspersed among the areas occupied by cube corner members, the proportion of such transparent areas to the total sheeting area and their arrangement relative to each other being fixed to allow viewing the sign by means of either internal illumination, retroreflected light, or both."

Japanese Patent Publication (Laid-open) 2 (1990)-285301-A (U.S. Pat. No. 5,122,902) to Benson, et al. also has disclosed:

"an internally illuminated sign comprising a cover transmissive to light on at least one side, designated the front side, a cover to reflect light incident on the front of the sign, and a retroreflective sheet positioned to reflect light incident on the front of the sign, which uses a partially transparent retroreflective article formed by three intersecting sets of parallel grooves, comprising a base, prismatic elements having lateral faces intersecting the base at base edges, and separation surfaces on the base, in which:

(a) each set of grooves has a groove side angle that is constant for that set;

(b) the separation surfaces are transparent, are bounded by the base edges of the lateral faces of the prismatic elements, lie between the prismatic elements in at least one of the grooves and have, taken at any point along any groove in which they lay, curved cross sections."

Furthermore, a number of improvements with the view to improve visibility of retroreflective sheetings in the daylight have heretofore been reported, as one of which it is generally known to give a fluorescent appearance to the sheeting by incorporating a fluorescent coloring agent in any one of the layers forming the retroreflective sheeting.

For example, U.S. Pat. No. 3,830,682 to Rowland disclosed that fluorescent retroreflective sheetings of distinct color tone could be prepared by blending a fluorescent coloring agent such as Rhodamine B Extra, Rhodamine 6DGN, Fluorol 7GN or Amaplast Orange LFP with the prismatic layer of triangular-pyramidal cube corner retroreflective sheetings.

U.S. Pat. No. 5,387,458 to Pavelka, et al. has disclosed fluorescent retroreflective sheetings having distinct color tone, comprising a screen layer which is substantially transparent to visible light and absorbs ultraviolet light; and a triangular-pyramidal cube-corner retroreflective element layer to which a thioindigoid, thioxanthene, benzoxazole coumarine or perylene imide dye has been added.

U.S. Pat. No. 5,605,761 to Burns, et al. discloses a fluorescent retroreflective sheeting having distinct color tone, into whose triangular-pyramidal cube-corner retroreflective layer a thioxanthone, perylene imide or thioindigoid fluorescent coloring dye and a hindered amine light stabilizer are added.

Furthermore, U.S. Pat. No. 5,672,643 to Burns, et al. discloses a fluorescent retroreflective sheeting having a color tone within a specific range, in which the reflective element layer in a cube-corner retroreflective sheeting contains, in combination, a perylene imide fluorescent coloring agent having a specific structure and a specific fluorescent coloring agent among Lumogen F Yellow 083, CI Solvent Yellow 160:1, CI Solvent Green 4, CI Pigment Yellow 101, CI Solvent Yellow 131, CI Solvent Yellow 98, Oraset Yellow 8GF, CI Solvent Green 5 and Golden Yellow D-304.

Said cube-corner retroreflective sheeting (corresponding to the prismatic retroreflective sheeting said in the preset invention) shown in the Bradshow Patent, however, comprises a cover layer having a multiplicity of retroreflective cube-corner members and a base layer of transparent material bonded to the cover layer and, because the base layer has the areas bonded to the cover layer, at the bonded areas the retroreflective function of the prismatic retroreflective elements is destroyed. The sheeting, therefore, is subject to a problem that its retroreflectivity as a whole is markedly reduced.

Retroreflective sheetings having such bonded areas are heretofore well known and are normally marketed as retroreflective sheetings of a form as disclosed in U.S. Pat. No. 4,025,159 to McGrath, for example, to secure an encapsulation structure to insure provision of an air layer behind the prismatic retroreflective elements. Said patent also discloses various resins capable of forming optically transparent or non-transparent bonded areas, to give an encapsulation structure to glass beads retroreflective sheeting or cube-corner retroreflective sheeting.

These prismatic retroreflective sheetings as described in the above are well known, for example, as Scotchlite Diamond Grade manufactured by Minnesota Mining and Manufacturing Company, U.S.A., or Nikkalite Crystal Grade manufactured by Nippon Carbide Industries, Co., Inc. According to measurements conducted by the present inventors, the reduction in retroreflectivity of these products due to their encapsulation structure amounts to as much as 30 to 40%. It was also found that percent transmission of light from an illuminator placed at the back decreases at the bonded areas.

The products furthermore are subject to problems that their appearances are impaired or relatively small-sized letters displayed thereon are difficult of reading, because a uniform appearance cannot be achieved with above encapsulation structures wherein the retroreflective areas and sealing bond areas differ in color and qualitative impression.

Also in such retroreflective sheeting as proposed by Benson, which uses prismatic retroreflective elements having separation surfaces therebetween, the prismatic retroreflective elements are absent at the areas where the separation surfaces are provided, similarly to the elements disclosed in Bradshaw, and hence the sheeting is subject to a problem that its reflectivity as a whole is markedly reduced.

In an internally illuminated sign, its light source is installed inside said sign and a drawback of reduced visibility hardly arises no matter from which direction the sign is viewed. In occasions of power failure or lamp trouble, however, presence of the sign is confirmable only by retroreflection of the light from its head lamp. In such occasions, in particular, when the light's incident or entrance angle is large, visibility of the sign is drastically impaired. Hence it is particularly important for internally illuminated signs to use retroreflective elements of excellent entrance angularity. Internally illuminated signs using retroreflective elements exhibiting such excellent entrance angularity, however, are heretofore unknown. Moreover, internally illuminated signs known heretofore are subject to still additional problem of entrance angularity degradation, simultaneously with the reflectivity reduction caused for the reasons as describes in the above.

On the other hand, for many of the traffic signs equipped with commercialized prismatic retroreflective sheetings, fluorescent colors are adoped for excellent visibility in the daytime. It can be easily inferred to adopt such fluorescent-colored prismatic retroreflective elements to those internally illuminated signs as shown in the patents to Bradshaw or Benson. Whereas, while adoption of fluorescent colors may improve the sign's daytime visibility, it is still difficult to solve the problem of reduction in retroreflectivity or to achieve excellent angularity.

Accordingly, therefore, an object of the present invention is to provide an internally illuminated sign which can be used for traffic signs such as road signs, regulatory signs, guide signs and construction signs, and commercial signs, and which exhibits improved visibility not only in daytime but also at night, because it is equipped with an information display section having a surface which retroreflects light coming from the front of the sign and transmits light from interior of the sign.

Another object of the present invention is to provide an internally illuminated sign having excellent visibility at wide angle range even in occasions of power failure or lamp trouble, because of its adoption of retroreflective elements which exhibit excellent retroreflective characteristics at broad entrance angle range.

A still further object of the present invention is to provide an internally illuminated sign in which the color used in the information display section in said retroreflective, internally illuminated sign is fluorescent in daytime, and visibility of the sign not only in daylight but at night is further improved.

DISCLOSURE OF INVENTION

The internally illuminated sign of the present invention is one which comprises an information display section having at least one flat or curved surface which retroreflects light from the front of said sign and transmits light from the interior of the sign; an illuminator disposed on the back of the information display section; and a housing enclosing and holding these information display section and illuminator, said sign being characterized in that the retroreflective element used in said information display section is a prismatic retroreflective element in accordance with the principle of total internal reflection, a large number of said prismatic retroreflective elements are disposed in closest contact with each other to form a continuous retroreflective plane, and at least the retroreflective area on the back of said large number of prismatic retroreflective elements has no bonded portion with other layers.

Said information display section has at least one flat or curved surface, which is retroreflective to the light coming from the front of the sign and transmissive to the light from interior of the sign, and is formed of a surface-protective layer for protecting the sign from water, light and soil from outside; an information display layer for displaying informations with letters or images; a retroreflective layer; a light-scattering layer for scattering light; and a support layer for carrying the foregoing layers. These layers may be installed each by itself or in combination.

The material for making said surface-protective layer for protecting the sign from water, UV light, visible light, soil and the like from outside sources is not critical so long as it is light-transmissive and excels in durability. For example, plastic sheet such as of acrylic resin, polycarbonate resin, polyvinyl chloride resin, or the like or glass plate or the like can be used. Such surface-protective layer preferably maintains an encapsulation structure with said housing to prevent penetration of water or humidity from outside, aided by various sealing materials or packing.

Said information display layer for displaying information with letters or images is formed of, for example, colored, partially light-transmissive or non-light transmissive area provided by a printing method, area provided by colored, partially light-transmissive or non-light-transmissive plastic sheets or area of non-light transmissive metal sheets.

Said retroreflective layer reflects light coming from outside the sign toward its source, and transmits the light from interior of the sign. Retroreflective elements useful for the retroreflective layer are prismatic retroreflective elements. More specifically, at least one kind of prismatic retroreflective elements selected from a group consisting of triangular-pyramidal cube-corner elements, full-cube-corner elements, tent-formed cube-corner elements and cross-prismatic elements can be used.

Said light-scattering layer for scattering light scatters the light from a light source device to give a uniform lightness to the sign. As useful light-scattering layer, plastic sheet of a transparent resin to which light-scattering microparticles of titanium oxide, zinc oxide or the like have been added, plastic sheet of similarly transparent resin containing as sealed therein fine gaseous particles and hence being white in appearance, or plastic sheet on whose surface formed are fine projections and depressions and the surface is whereby rendered light-scattering, can be used either alone or in combination.

Those surface-protective layer, information display layer, retroreflective layer and light-scattering layer may each be installed by itself independently of each other, or can be fixed on a support layer which holds these layers with such physical fixing means as, for example, an adhesive, pressure sensitive adhesive, heat sensitive adhesive, thermal fusion or the like; or with mechanical fixing means using bolts, screws, rivets or the like. It is important for preventing reduction in retroreflectivity, furthermore, that the retroreflective elements-assembled surface, which is provided by an assembly of a large number of retroreflective elements arranged in closest contact with each other, forms a continuous retroreflective plane in the retroreflective layer, and that the backs of the prisms have no bonding part with other layers at least at retroreflective area of the information display section, said section being substantially free of any encapsulation structure which requires bonds. Where such bonding portions must be provided, it is desirable to provide them at the light-shielding potions such as the edges or lower printing margin which do not contribute to retroreflection.

The internally illuminated sign according to the present invention has at least one flat or two-dimensionally or three-dimensionally curved surface. Said flat or curved surface(s) can be used either singly or in combination. Moreover, for example, a cylindrical, internally illuminated sign can be formed by combining a surface-protective layer, information display layer, retroreflective layer and a light-scattering layer into a cylindrical shape. Such a cylindrical, internally illuminated sign can retroreflect external light from all directions and excels in visibility. As its specific utility, it can be used for safety poles installed at road edges or median strips.

The diameter of such a cylindrical, internally illuminated sign may range, for example, 30 to 500 mm, preferably 50 to 200 mm, but is not limited thereto.

As prismatic retroreflective elements useful for the present invention, at least one kind of prismatic retroreflective element selected from a group consisting of triangular-pyramidal cube-corner element, full cube cube-corner element, tent-formed cube-corner element and cross prismatic element can be used. These kinds may be used either singly or in combination.

Of these, triangular-pyramidal cube-corner element is preferred, because it can be easily formed into micro-fine size element, to facilitate provision of thin sheeting. Size of useful triangular-pyramidal cube-corner element (i.e., height from apex of a prism to its base plane) is preferably 50 to 500 μm, in particular, 80 to 150 μm, for easy preparation of flexible sheeting. The elements of a size less than 50 μm are too small, causing excessive light diffusion due to diffraction effect and resulting in degradation in reflective performance. Whereas, the elements exceeding 500 μm render thickness of their sheeting too large, which causes such problems as drop in percent light transmission to degrade retroreflectivity or the sheeting is short of flexibility and difficult of forming a curved plane, and is undesirable.

For insuring excellent entrance angularity, furthermore, optical axes of the elements are preferably tilted each at an angle of 0.5 to 20° and −0.5 to −20° to the base plane of respective elements. In particular, tilting by 1 to 8° and −1 to −8° is preferred for obtaining excellent entrance angularity and retroreflectivity. Where optical axes are tilted by more than 20°, retroreflectivity particularly in its front direction may excessively drop, which is undesirable.

Use of triangular-pyramidal cube-corner elements which are disclosed in Japanese Patent 2954709 (U.S. Pat. No. 6,083,607) and Japanese Patent Publication (Laid-open) 11 (1999)-149006-A (U.S. Pat. No. 6,685,323) to Mimura, et al. and in which one of V-formed grooves forming the elements is cut more deeply or shallowly than the other grooves, is preferred for achieving excellent entrance angularity.

The prismatic retroreflective elements which are used in the present invention are those based on the principle of total internal reflection, and the retroreflective element-assembled plane formed by a dense assembly of a large number of said elements constitutes a continuous retroreflective plane. Hence, transparent bond portions to allow light transmission or separation surfaces to separate prisms from each other is substantially absent, and reduction in retroreflectivity at, in particular, broad entrance angles can be minimized. For further improving the entrance angularity a retroreflective device can be used, in which pairs of triangular-pyramidal cube-corner retroreflective elements are arranged in closest-packed state on a common base plane (S-S'), protruding from one side of said base plane, each element being defined by three lateral faces ($a_1$, $b_1$, $c_1$, or $a_2$, $b_2$, $c_2$) which intersect with each other at substantially right angles and which are formed by mutually intersecting V-formed grooves of substantially symmetrical cross-sections, said pair of triangular-pyramidal retroreflective elements forming a pair as their two confronting lateral faces ($c_1$, $c_2$) have one base line (x) in common, said base plane (S-S') being a common plane including both of the base lines (z, z) of another side of lateral faces ($a_1$, $a_2$) of said pair of triangular-pyramidal retroreflective elements and the base lines (y, y) of the remaining side of lateral faces ($b_1$, $b_2$), another V-formed groove (w, w . . . ) of substantially uniform cross-sectional configuration paralleling with said common base line (x) crossing said lateral faces ($a_1$, $b_1$) formed by said grooves (y, z) of the triangular-pyramidal retroreflective elements, at such sites not cutting off the apexes ($H_1$, $H_2$) of the triangular-pyramidal retroreflective elements, whereby dividing said faces ($a_1$, $b_1$) into plural sub-faces ($a_{11}$, $b_{11}$, $a_{12}$, $b_{12}$ and $a_{13}$, $b_{13}$ . . . ) to form at least two sets of cube-corner element pairs defined by three substantially perpendicularly intersecting sub-faces ($a_{11}$, $b_{11}$, $a_{12}$, $b_{12}$ and $a_{13}$, $b_{13}$ . . . ), and optical axes of these cube-corner element pairs have substantially identical tilt angles (θ) in respect of said common base line (x), although the direction of the tilt differs mutually by 180°. Such retroreflective element pairs as described in the above can be used in the present invention.

Such elements are more fully described in WO 03/014779 (US 2005/0018292 A1) to Mimura, et al. In addition to the foregoing description the element is said to provide excellent entrance angularity over the tile angle of its optical axes ranging 0.5 to 20°, and is preferred because its use allows easy confirmation of presence of the sign with the light source of its head lamp, even when the internal illumination is stopped due to such troubles as power failure.

FIG. 8 shows a cross-sectional construction of a retroreflective sheeting of known structure from Bradshaw. With a retroreflective sheeting having the illustrated structure, undesirable reduction in retroreflectivity takes place because retroreflection does not take place at the bond areas. Whereas, the retroreflective sheeting used in the present invention is free from any reduction in retroreflectivity, particularly because transparent bonding areas for transmitting light as disclosed in the Bradshaw Patent or separation planes interposed between prisms as disclosed in the Benson Patent are substantially absent, as illustrated in FIG. 9.

As resins useful for said retroreflective layer, those which are optically transparent and have relatively high refractive index are preferred, examples of which include polycarbonate resin, vinyl chloride resin, (meth)acrylic resin, epoxy resin, styrene resin, polyester resin, fluorine-containing resin, olefin resin such as polyethylene resin or polypropylene resin, and the like; cellulosic resin and urethane resin.

These resins useful for making the retroreflective layers are also useful for making the surface-protective layers for protecting the signs of the present invention from water, light and soil from outside, the information display layers for displaying informations with letters, pictures and the like, the light-scattering layers for scattering light and the support layers for carrying the foregoing layers, of the present invention.

Such resins used for above retroreflective layers, surface-protective layers, information display layers, light-scattering layers and support layers may be incorporated with UV absorber, light stabilizer, antioxidant and the like either singly or in combination, with the view to improve their weatherability. Furthermore, it is preferred to have the resins contain various organic pigment, inorganic pigment, fluorescent pigment, dyes and fluorescent dyes or the like as coloring agent.

To said retroreflective layer or each of other layers constituting the information display section, UV absorber may be added for improving their weatherability. As the UV absorber, benzotriazole, triazine or benzophenone UV absorbers can be used. Examples of benzotriazole UV absorber include Seesorb™ 701, 702, 703, 704, 706 and 709 made by Shipro Kasei Kaisha, Ltd.; Adeka Stab™ LA 31, LA 32 by Asahi Denka Kogyo Co., Ltd.; Sumi Sorb™ 250 by Sumitomo Chemical Co., Ltd.; and Viosorb™ 590 by Kyodo Chemical Co., Ltd. As triazine UV absorber, Tinubin™ 1577 by Ciba Specialty Chemicals K.K. can be used. Examples of benzophenone UV absorber include Adeka Stab™ 1413 and LA 51 by Asahi Denka Kogyo Co., Ltd.; Seesorb™ 1001 and 103 by Shipro Kasei Kaisha, Ltd.; and Sumi Sorb™ 110 S by Sumitomo Chemical Co., Ltd. Preferred amount of such a UV absorber to be added is 0.01 to 1 part by weight.

To the retroreflective layer or surface-protective layer according to the invention, hindered amine light stabilizer may be added to improve their weatherability. In particular, addition of piperidine-type hindered amine light stabilizer having a tertiary amine structure of a molecular weight of at least 600 is preferred as it is capable of imparting durable weatherability. Examples of useful hindered amine light stabilizer include Tinubin™ 622 LD, 765, 144 and Chimassorb™ 119 FL by Ciba Specialty Chemicals K.K.; Adeka Stab™ LA 52 and LA62 by Asahi Denka Kogyo Co., Ltd.; and Sanol™ LS 2626 by Sankyo Lifetech Co., Ltd.; and the like. These hindered amine light stabilizers can be added to a resin layer or layers to which fluorescent dye is added, either by itself or in combination with UV absorber or antioxidant. Preferred amount of addition is 0.1 to 1 part by weight.

Above light stabilizer may also be copolymerized with the resin to which fluorescent dye is added, in the form of, for example, methacrylic acid ester. As reactive light stabilizer, 1,2,2,6,6-pentamethylpiperidyl methacrylate, 2,2,6,6-tetramethyl-piperidyl methacrylate or the like may be named, which can copolymerize with other reactive monomer constituting the resin, e.g., acrylates, methacrylates, vinyl acetate, vinyl chloride or the like, to be taken into the skeletal structure of said resin.

Furthermore, for the layer or layers containing fluorescent dye as described in the present invention, benzoate light stabilizer can be added for imparting weatherability. Examples of useful benzoate light stabilizer include Tinubin™ 120 by Ciba Specialty Chemicals K.K.

Examples of useful antioxidant include: as amine antioxidant, naphthylamine-, diphenylamine- and phenylenediamine-types; and as phenol antioxidant, quinoline-, hydroquinone-, monophenol-, polyphenol- and bisphenol-types.

The retroreflective layer, and also other layers constituting the information display section, i.e., the surface-protective layer, information display layer, light-scattering layer and the support layer, may contain various coloring agents. As the coloring agents, various inorganic or organic pigments and dyes can be used.

Examples of those pigments or dyes, various inorganic pigments or various organic pigments and dyes can be used. Of those, organic pigments and dyes, inter alia, organic dyes, are preferred because of their high transparency.

As coloring means using these pigments or dyes, they may be blended in the resins forming these layers, or may be provided as an independent, printed layer with such means as ordinary gravure printing, screen printing or ink jet printing.

It is particularly preferred to use fluorescent colors as the colors in daytime (daylight colors) in the colored area which are provided by above coloring means to display informations, to improve visibility of the informations to automobile drivers in daytime. Furthermore, it is particularly preferred to adopt fluorescent colors for the retroreflective area, to improve the visibility for drivers also at night. As examples of these fluorescent pigments or dyes, heretofore known fluorescent dyes adopted for improving daylight visibility as earlier described can be used.

Most advantageously, for the retroreflective layers according to the invention, benzimidazole coumarin fluorescent dyes, benzopyran fluorescent dyes, diketopyrrolopyrrole dyes and coumarin fluorescent dyes can be used either singly or in combination of at least two. They may also be used in combination with other fluorescent dyes or other non-fluorescent dyes or pigments. A detailed description of these suitable dyes is presented in Mimura, et al.'s Japanese Patent Publication (Laid-open) 2001-296413-A (US 2003/0100637 A1).

U.S. Pat. No. 3,830,682 to Rowland discloses fluorescent retroreflective sheeting with clear color tone can be prepared by blending fluorescent coloring agent such as Rhodamine B Extra, Rhodamine 6 DGN, Fluorol 7GN or Amaplast Orange LFP in prismatic layers of triangular-pyramidal cube-corner retroreflective sheeting.

Also those thioindigoid, thioxanthene, benzoxazole coumarin or perylene imide dyes which are disclosed in U.S. Pat. No. 5,387,458 to Pavelka can be used.

Likewise, thioxanthone, perylene imide or thioindigoid fluorescent coloring agents which are disclosed in U.S. Pat. No. 5,605,761 to Burns, et al also are usable.

Furthermore, perylene imide fluorescent coloring agent of specific composition in combination with specific fluorescent coloring agent selected from Lumogen F Yellow 083, CI Solvent Yellow 160:1, CI Solvent Green 4, CI Pigment Yellow 101, CI Solvent Yellow 131, CI Solvent Yellow 98, Oraset Yellow 8GF, CI Solvent Green 5 and Golden Yellow D-304 as disclosed in U.S. Pat. No. 5,672,643 to Burns, et al. may also be used.

As working embodiments of preferred fluorescent colors, the daylight colors of the information display section in said retroreflective, internally illuminated sign are fluorescent colors, in particular, those having fluorescent luminescence factor, $Y_F$ value, of at least 10, inter alia, at least 15.

Said fluorescent luminescence factor $Y_F$ value as referred to in this invention is calculated from reflection spectrum of sample fluorescent substance as measured by bispectroscopic method specified by U.S. ASTM Standards, E2153-01 and E2152-01. According to said method, where dispersed, single-wavelength incident light is entered in a substance, its reflected light is observed as a further dispersed reflection spectrum, so that ordinary simple reflection spectrum and fluorescent spectrum whose wavelength is changed by energy conversion can be separately measured. Fluorescent luminescence factor, "$Y_F$ value" in this invention refers to fluorescence reflection spectrum component.

As an illumination device useful for the present invention, either a back projector-type or side-projector type illuminating device can be used. As the light source useful in each type of illuminating devices, fluorescent lamp, cold-cathode tube, halogen lamp, Xenone lamp, sodium lamp or LED can be used. Such various light sources are preferably combined with back-reflective plate or light-guiding plate, to achieve uniform luminance. A back-reflective plate used in the present invention has a parabolic cross-sectional configuration focusing on the center of the light source, and is most preferably positioned to allow the light emitted by the light source to enter into the prismatic retroreflective elements from their backs at an entrance angle of 0 to 30° to the normal line of the surface(s) constituting the information display section.

Of those useful light sources, LED, in particular, white LED, is preferred as a low energy-consuming, lowly exothermic and yet high illuminance light source.

A combination of such a light source with a light-guiding plate is an excellent illumination device for making a thin internally illuminated sign. While any suitable light-guiding plate can be selected, for example, a white sheet of high reflectivity, milk-white, semi-transparent plate, prismatic sheet with linear grooves cut on the surface and prismatic sheet with a surface on which triangular-pyramidal or quadrangular-pyramidal prisms are formed can be used.

Use of a planar luminophor of electroluminescent material (EL) as the light source also is adequate for making a thin internally illuminated sign. A planar luminescent type illuminator based on the principle of EL gives an internally illuminated sign showing very uniform luminance distribution, and hence is particularly preferred.

Adoption of above-described light-guiding plate or planar luminophor is preferred because it facilitates entrance of the light emitted by the illuminator used in the retroreflective internally illuminated sign of the present invention into the prismatic retroreflective elements from the back, at an entrance angle of 0 to 30° to the normal line of the surface(s) constituting the information display section, to effectively intensify the light transmitting from the back to the front of the sign. Where the entrance angle of the light exceeds 30°, effective transmission of the light becomes difficult and such is undesirable.

Above-described information display section and illuminator are integrated by a housing which encloses them. The shape of the housing is not critical, which can be suitably selected among rectangular parallelepipeds, columns and the like. The material making up said body again is not critical, various materials such as plastics, wood, stone and the like can be used either singly or in combination. While it is preferred for the housing to take an encapsulation construction to prevent infiltration of water and dust from outside, a construction allowing discharge of internally generated vapor, heat or externally infiltrated water to outside may also be adopted.

Furthermore, accessory devices such as a power source may be installed inside or outside of the housing. The sources include ordinary external alternating-current power supply, direct-current storage battery and solar battery. In particular, an illuminator formed of a combination of solar battery with low-energy EL light source is preferred from the standpoint of free maintenance, long life and low energy cost.

BEST MODE FOR CARRYING OUT THE INVENTION

Figure 1:
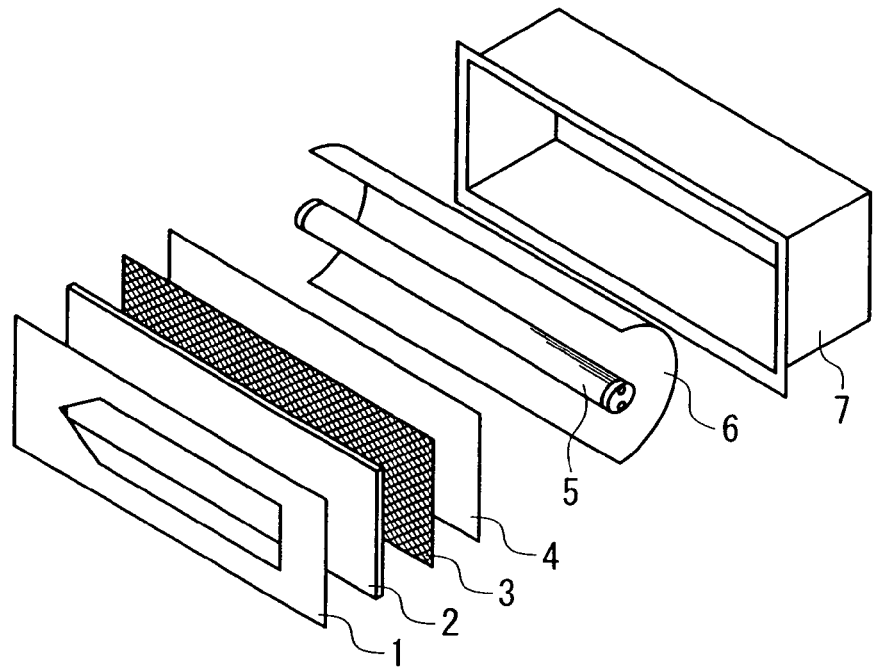
FIG. 1 is a schematic view showing an example of working embodiment of an internally illuminated sign according to the present invention.

Hereinafter the invention is explained in further details, referring to the drawings.

FIG. 1 is a schematic view showing an example of working embodiment of an internally illuminated sign according to the present invention. The information display section having a surface which is retroreflective to the light from the front surface of the sign and is transmissive to the light from the interior of the sign, is composed of an information display layer (1), surface-protective layer (2), retroreflective layer (3) and a light-scattering layer (4). An illuminator disposed on the back of the information display section is composed of a light source (5) and a back reflection layer (6). Furthermore, these information display device (1-4) and illuminator (5, 6) are enclosed and held in a housing (7).

In the working embodiment illustrated in FIG. 1, the information display layer (1) is installed in front of the surface-protective layer (2) as an independent layer, but it can be installed at any position such as at the front or back of any of those surface-protective layer (2), retroreflective layer (3) and light-scattering layer (4). Said information display layer (1) may be installed in the form of a plastic or metal plate as an independent layer, or it may be stuck on each of the layers (2-4) as a printed layer or a colored plastic adhesive sheet layer.

In the embodiment of FIG. 1, the back reflection plate has a parabolic cross-section having a focus at the center position of the light source, and is so positioned as to enable the light emitted from the light source to enter from the back of the prismatic retroreflective elements at an entrance angle of 0 to 30° to the normal line of the surface(s) constituting the information display section.

Figure 2:
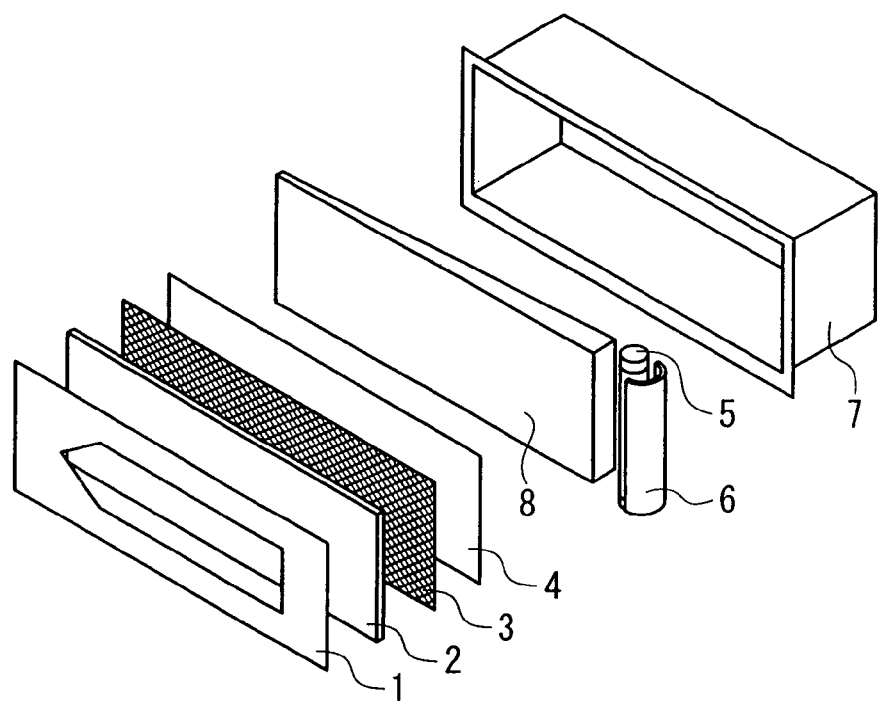
FIG. 2 is a schematic view showing another example of working embodiment of an internally illuminated sign according to the present invention.

FIG. 2 is a schematic view showing an example of working embodiment of an internally illuminated sign according to the present invention. The illuminator installed on the back of the information display section is composed of a light source (5), light-guiding plate (8) and a back reflection layer (6). Light emitted by the light source (5) enters, either directly or as reflected by the back reflection layer (6), into the light-guiding plate (8), and further its direction is changed to direct the information display section. Such an embodiment using an illuminator equipped with a light-guiding plate gives an internal illuminator of uniform luminance.

Figure 3:
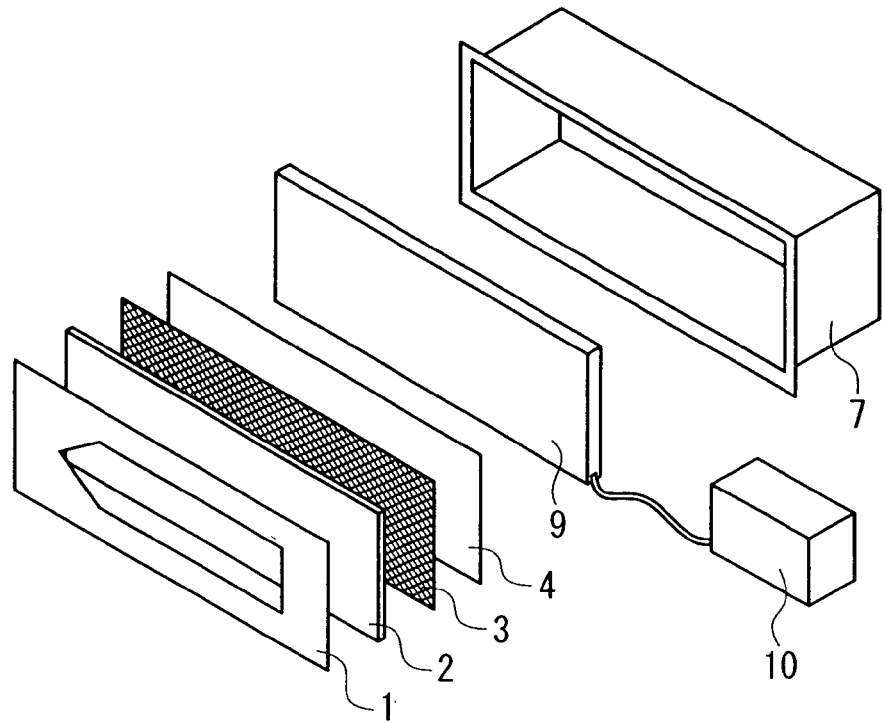
FIG. 3 is a schematic view of still another example of working embodiment of an internally illuminated sign according to the present invention.

FIG. 3 is a schematic view showing still another embodiment of an internally illuminated sign according to the present invention. In the embodiment of FIG. 3, a planar luminophor (9) such as an EL or LED array is adopted as the illuminator, and such an embodiment of an illuminator equipped with a planar luminophor can also provide an internal illuminator of uniform luminance. The power supply (10) may be one which supplies power from an outside source to the planar luminophor (9) or a storage battery which stores externally supplied power from a solar battery or the like. Such power supply devices can be adopted also in the embodiments of FIG. 1 or FIG. 2.

Figure 4:
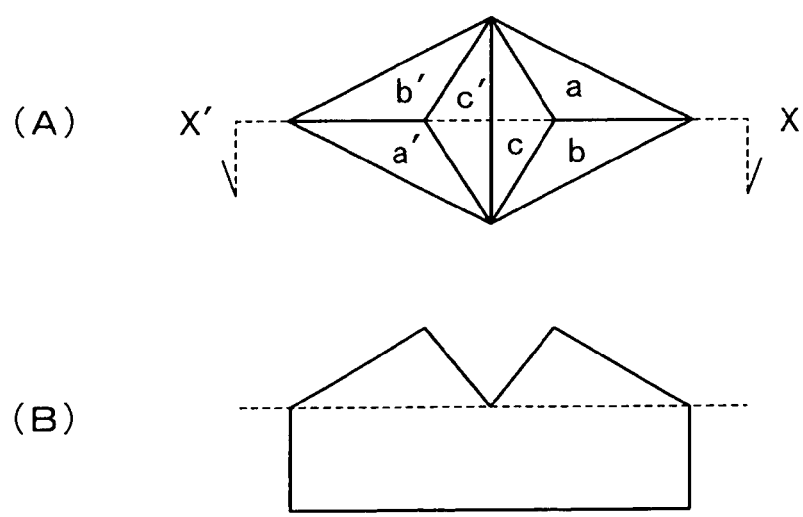
FIG. 4 is a plan view (FIG. 4 (A)) of a triangular-pyramidal cube-corner retroreflective element which is an embodiment of prismatic retroreflective element based on the principle of total internal reflection useful for the present invention; and a cross-sectional view (FIG. 4(B)) thereof cut along the section line X-X'.

FIG. 4 shows a plan view (FIG. 4 (A)) of a triangular-pyramidal cube-corner retroreflective element which is an embodiment of prismatic retroreflective element based on the principle of total internal reflection useful for the present invention; and a cross-sectional view (FIG. 4(B)) thereof cut along the section line X-X'. Such triangular-pyramidal cube-corner retroreflective elements are normally configured as laterally symmetrical pairs of elements. Preferably the optical axes of two elements in a pair have a same degree of tilt in opposite directions, to favorably improve entrance angularity. The three faces constituting each element in a pair (a, b, c or a', b', c') are substantially perpendicular to each other, which can be given a minor deviation for improving visibility to a viewer who observes the retroreflection. As such a deviation, normally 0.001° to 0.1° is preferred.

Figure 5:
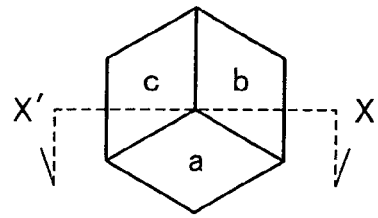
FIG. 5 is a plan view (FIG. 5 (A)) of a full cube type cube-corner retroreflective element which is another embodiment of prismatic retroreflective element based on the principle of total internal reflection useful for the present invention; and a cross-sectional view (FIG. 5(B)) thereof cut along the section line X-X'.
Figure 5:
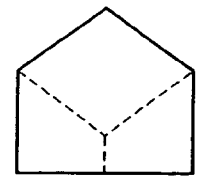

FIG. 5 shows a plan view (FIG. 5 (A)) of a full cube type cube-corner retroreflective element which is another embodiment of prismatic retroreflective element based on the principle of total internal reflection useful for the present invention; and a cross-sectional view (FIG. 5(B)) thereof cut along the section line X-X'. The three faces (a, b, c) constituting each element are substantially perpendicular to each other, which can be given a minor deviation for improving visibility to a viewer who observes the retroreflection. As such a deviation, normally 0.001° to 0.1° is preferred.

Figure 6:
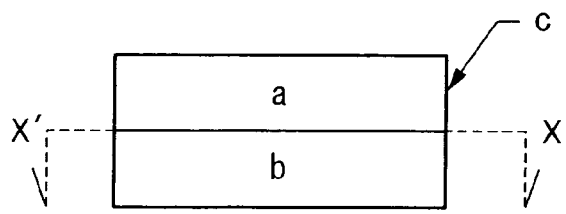
FIG. 6 is a plan view (FIG. 6(A)) of a tent-type cube-corner retroreflective element which is another embodiment of prismatic retroreflective element based on the principle of the total internal reflection useful for the present invention; and a cross-sectional view (FIG. 6(B)) thereof cut along the section line X-X'.
Figure 6:
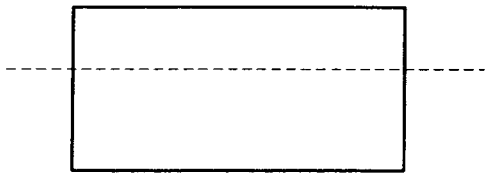

FIG. 6 shows a plan view (FIG. 6(A)) of a tent-type cube-corner retroreflective element which is another embodiment of prismatic retroreflective element based on the principle of total internal reflection useful for the present invention; and a cross-sectional view (FIG. 6(B)) thereof cut along the section line X-X'. Similar to the elements as illustrated in FIGS. 4 and 5, the three faces (a, b, c) constituting each element are substantially perpendicular to each other, which can be given a minor deviation for improving visibility to a viewer who observes the retroreflection. As such a deviation, normally 0.001° to 0.1° is preferred.

Figure 7:
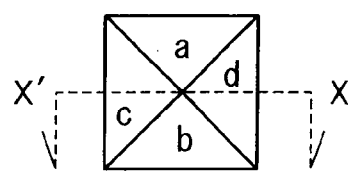
FIG. 7 is a plan view (FIG. 7(A)) of a full cube type cube-corner retroreflective element which is an embodiment of prismatic retroreflective element based on the principle of total internal reflection useful for the present invention; and a cross-sectional view (FIG. 7(B)) thereof cut along the section line X-X'.
Figure 7:
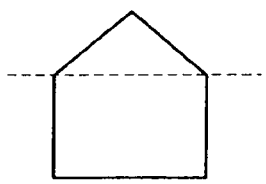

FIG. 7 shows a plan view (FIG. 7(A)) of another full cube type cube-corner retroreflective element which is an embodiment of prismatic retroreflective element based on the principle of total internal reflection useful for the present invention; and a cross-sectional view (FIG. 7(B)) thereof cut along the section line X-X'. Of the four faces (a, b, c, and d) constituting the element, each pair of confronting surfaces (a and b, c and d) are substantially perpendicular to each other, which can be given a minor deviation for improving visibility to a viewer who observes the retroreflection. As such a deviation, normally 0.001° to 0.1° is preferred.

Figure 8:
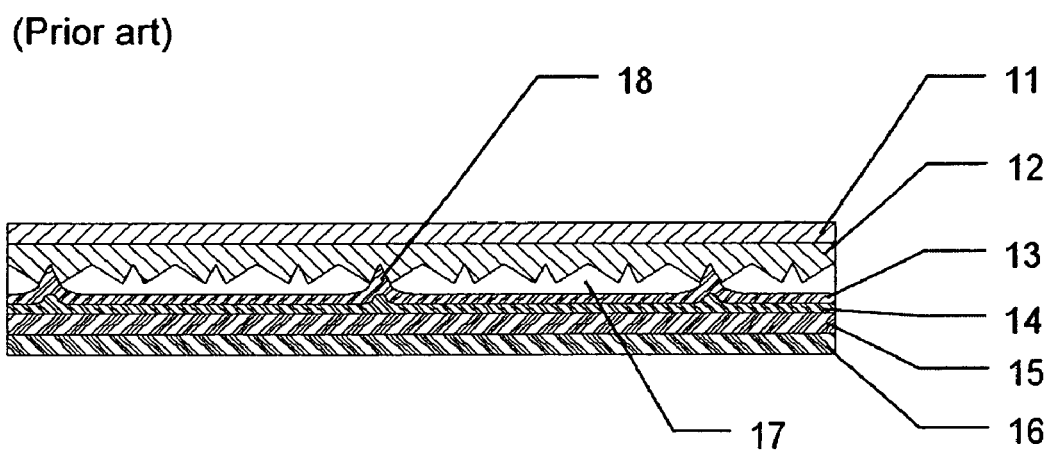
FIG. 8 is a cross-sectional view of a prismatic retroreflective sheeting according to prior art, in which an air layer is encapsulated by bonded portions.

FIG. 8 is a cross-sectional view of a prismatic retroreflective sheeting according to prior art, in which an air layer (17) is encapsulated by bonded areas (18). This retroreflective sheeting is formed of a surface-protective layer (11), prismatic retroreflective layer (12), binder layer (13), support layer (14), adhesive layer (15) and a release layer (16). Said release layer (16) is peeled off when the sheeting is stuck on other supporting member.

Figure 9:
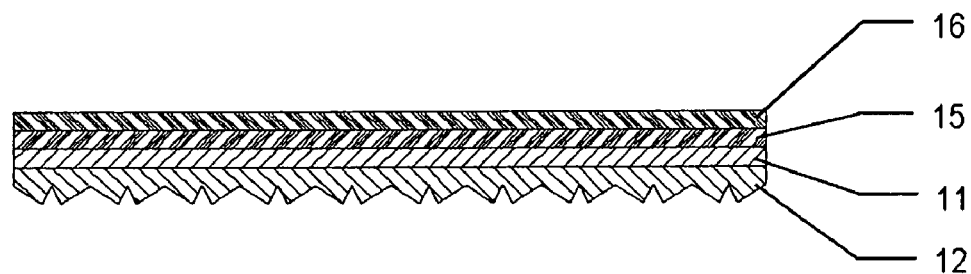
FIG. 9 is a cross-sectional view of a prismatic retroreflective sheeting according to the present invention, which has no bonded area.

FIG. 9 is a cross-sectional view of a prismatic retroreflective sheeting according to the present invention which is not encapsulated and is free of any bonded area. This retroreflective sheeting is composed of a release layer (16), adhesive layer (15), surface-protective layer (11) and a prismatic retroreflective layer (12). Said release layer (16) is peeled off when the sheeting is stuck onto a supporting member. Underneath the prismatic retroreflective layer (12), an air layer is necessary. Also as an information display layer, a colored transparent or opaque printed layer may be provided on or under the adhesive layer (15) or a surface-protective layer. Said prismatic retroreflective layer (12) is constructed from prismatic retroreflective elements following the principle of total internal reflection, and hence the prismatic retroreflective layer (12), as shown in FIG. 9 has no metallic coating or that sort on its bottom plane and is transparent. In consequence, the retroreflective sheeting FIG. 9 is retroreflective of the light coming from above and is transmissive to the light coming from the underside. That is, the retroreflective sheeting of FIG. 9 transmits the light from the light source provided (not illustrated) below FIG. 9, and also transmits the light from the illuminator disposed inside the sign.

Figure 10:
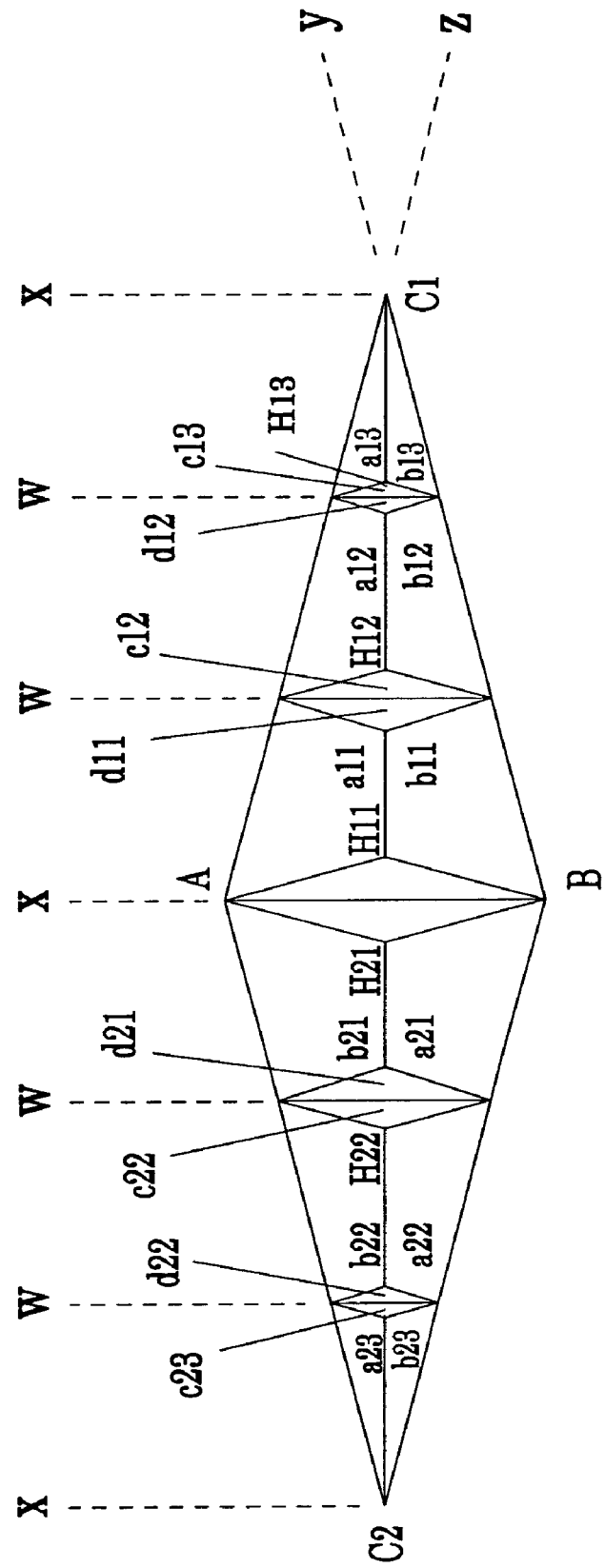
FIG. 10 is a plan view of a cube-corner type retroreflective element having three sets of paired optical axes, which is an embodiment of prismatic retroreflective element based on the principle of total internal reflection as shown in WO 03/014779 (US 2005/0018292 A1) by Mimura, et al. and which can be used in the present invention.

FIG. 10 shows a plan view of a corner-cube retroreflective element having three pairs of optical axes, which is an embodiment of the prismatic retroreflective elements according to the principle of total internal reflection, as disclosed in WO 03/014779 (US 2005/0018292 A1).

Figure 11:
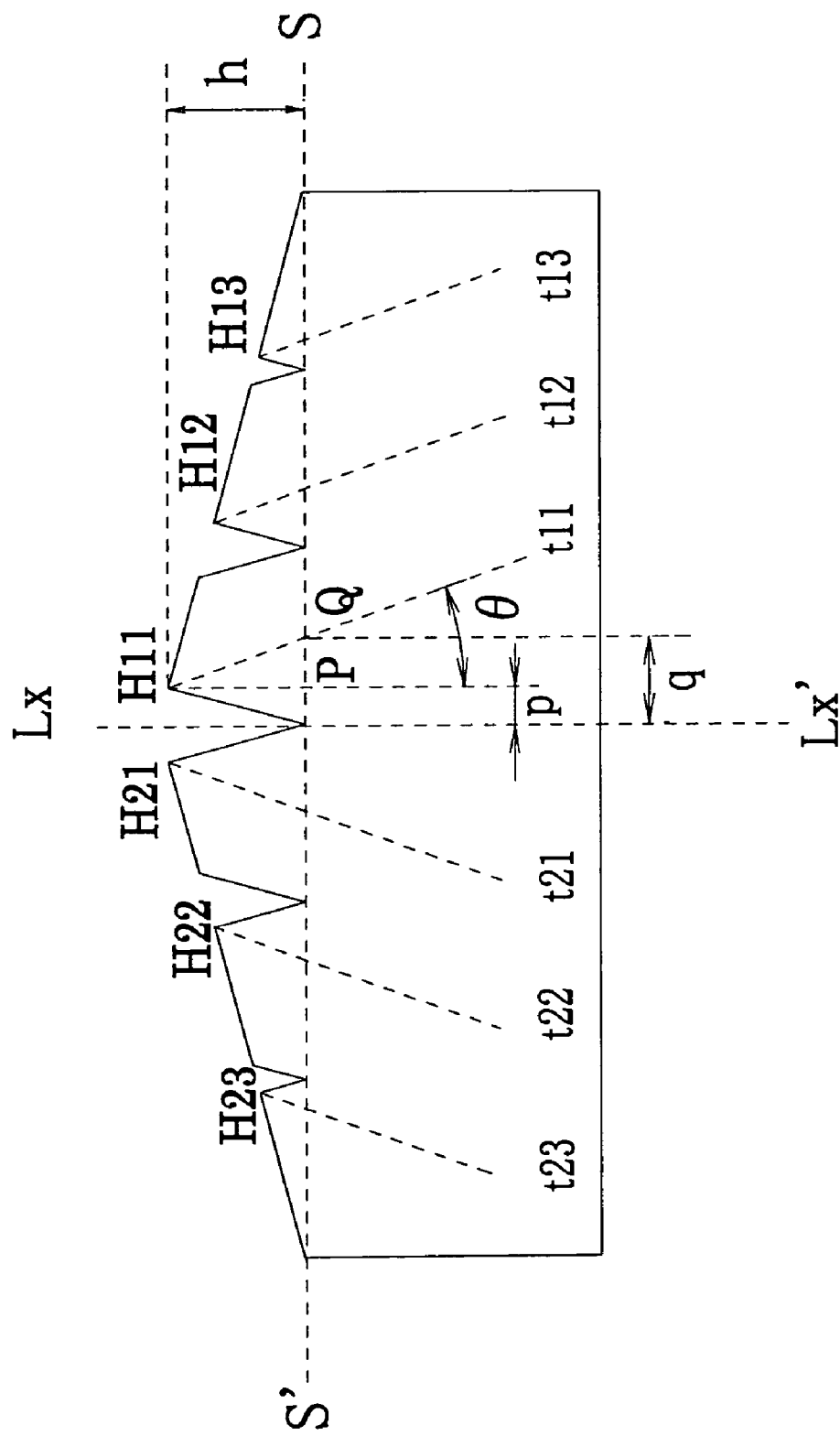
FIG. 11 shows the cross-section of the corner-cube type retroreflective element shown in FIG. 10.

FIG. 11 shows the cross-section of the corner-cube retroreflective element as shown in FIG. 10. The corner-cube retroreflective element as illustrated in FIGS. 10 and 11 comprises three pairs of corner-cube elements (H11, H12, H13 and H21, H22 and H23), and the three pairs of the optical axes of the respective pairs (t11, t12, t13 and t21, t22, t23) have the same tilt angle (θ) and opposite directions of the tilt.

Figure 12:
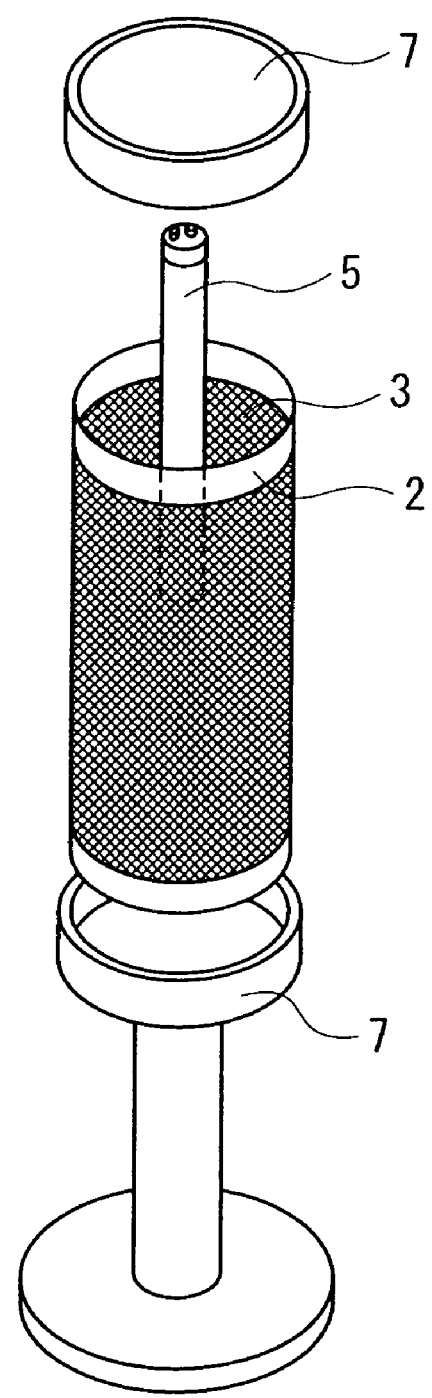
FIG. 12 is a schematic view showing an example of working embodiment of an internally illuminated sign according to the present invention.

FIG. 12 is a schematic view showing an example of working embodiment of an internally illuminated sign according to the present invention. The information display section having a surface which is retroreflective to the light coming from the front of the sign and is transmissive to the light from interior of the sign is formed of a surface protective layer (2) and a retroreflective layer (3). The illuminator installed at the internal space of said information display section is constituted of a light source (5). Furthermore, these information display device (2, 3) and the light source (5) are enclosed and held in a housing (7) which is separated into a top part and a bottom part, and are self-sustainable. An information display layer (1) or a light-scattering layer (4) may further be installed on the surface or back of the retroreflective layer (3) of the internally illuminated sign of FIG. 12.

An effect of the present invention is: because, in the internally illuminated sign according to the present invention, which is useful as traffic signs such as road signs, regulatory signs, guide signs, construction signs and the like, and commercial signs and has an information display section having a surface retroreflecting light coming from front of the signs and transmitting light coming from interior of the signs, whereby exhibiting improved visibility not only in daytime but also at night, a retroreflective element-assembled plane formed by a dense assembly of a large number of the elements provides a continuous retroreflective plane, and at least at the retroreflective area of the information display section the prismatic back surface has no bonded area with other layer(s) and is substantially free of encapsulation structure, the internally illuminated sign exhibits excellent retroreflectivity and excellent transmission of light from interior.

Another effect of the invention is that the internally illuminated signs exhibit excellent visibility at broad angles, in particular, even in such occasions as power failure or lamp troubles, because they adopt retroreflective elements having excellent retroreflection characteristics at broad entrance angles.

Still further effect of the present invention is that the retroreflective, internally illuminated signs exhibit more improved visibility not only in daytime but also at night, because the daylight of the information display sections used therein is fluorescent light.

The invention claimed is:

1. A retroreflective, internally illuminated sign which comprises an information display section having at least one flat or curved surface which retroreflects light coming from the front of said sign and transmits light from the interior of said sign; an illuminator disposed on the back of the information display section; and a housing enclosing and holding the information display section and illuminator, the information display section comprising a retroreflective sheet, said retroreflective sheet being a plurality of total internal reflection prismatic retroreflective elements, wherein a large number of said prismatic retroreflective elements are disposed in closest contact with each other to form a continuous retroreflective plane, the retroreflective part on the back of said prismatic retroreflective elements forming said continuous retroreflective plane having no area bonded to other layers.

2. An internally illuminated sign according to claim 1, in which said prismatic retroreflective elements are at least one kind of prismatic retroreflective elements selected from a group consisting of triangular-pyramidal cube-corner elements, full-cube cube-corner elements, tent-formed cube-corner elements and cross-prismatic elements.

3. An internally illuminated sign according to claim 2, in which said prismatic retroreflective elements comprise retroreflective element pairs which are pairs of triangular-pyramidal cube-corner retroreflective elements disposed in closest-packed state on a common base plane (S-S'), protruding from one side of said base plane, each element being defined by three lateral faces (a1, b1, c1, or a2, b2, c2) which intersect with each other at substantially right angle and which are formed by mutually intersecting V-formed grooves of substantially symmetrical cross-sections, said pair of triangular-pyramidal retroreflective elements forming a pair as their two confronting lateral faces (c1, c2) have one base line (x) in common, said base plane (S-S') being a common plane including both of the base lines (z, z) of another side of lateral faces (a1, a2) of said pair of triangular-pyramidal retroreflective elements and the base lines (y, y) of the remaining side of lateral faces (b1, b2), another V-formed groove (w, w ... ) of substantially uniform cross-sectional configuration paralleling with said common base line (x) crossing said lateral faces (a1, b1) formed by said grooves (y, z) of the triangular-pyramidal retroreflective elements, at such sites not cutting off the apexes (H1, H2) of the triangular-pyramidal retroreflective elements, whereby dividing said faces (a1, b1) into plural sub-lateral faces (a1, b11, a12, b12 and a13, b13 ... ) to form at least two sets of cube-corner element pairs defined by three substantially perpendicularly intersecting sub-lateral faces (a11, b11, a12, b12 and a13, b13 ... ), and optical axes of these cube-corner element pairs having substantially identical tilt angles (θ) in respect of said common base line (x), the direction of the tilt differing mutually by 180°.

4. An internally illuminated sign according to any one of claims 1-3, in which the daylight color of said information display section is fluorescent color.

5. An internally illuminated sign according to claim 4, in which the daylight color of said information display section is fluorescent color and its fluorescent luminescence factor YF is at least 10.

6. An internally illuminated sign according to any one of claims 1-3, in which the illuminator is either of a back projector type illuminator or a side projector type illuminator.

7. An internally illuminated sign according to claim 6, in which the back projector type illuminator is based on the principle of electroluminescence.

8. An internally illuminated sign according to any one of claims 1-3, in which the light emitted by the illuminator enters from the back of the prismatic retroreflective elements at an entrance angle of 0 to 30° to the normal line of the surface(s) constituting the information display section.

9. An internally illuminated sign according to any one of claims 1-3, in which said information display section has a cylindrical shape and is capable of retroreflecting light over substantially whole peripheral side of the information display section.

* * * * *

UNITED STATES PATENT AND TRADEMARK OFFICE
CERTIFICATE OF CORRECTION

PATENT NO. : 7,584,564 B2
APPLICATION NO. : 10/519748
DATED : September 8, 2009
INVENTOR(S) : Akihiro Matsuda et al.

It is certified that error appears in the above-identified patent and that said Letters Patent is hereby corrected as shown below:

COLUMN 1:

Line 13, "comprises" should read --comprises:--.

COLUMN 2:

Line 51, "preset" should read --present--; and
Line 52, "Bradshow Patent," should read --Bradshaw et al. Patent,--.

COLUMN 3:

Line 18, "of reading," should read --to read,--; and
Line 44, "describes" should read --described--.

COLUMN 4:

Line 50, "non-light transmissive" should read --non-light-transmissive--; and
Line 53, "non-light transmissive" should read --non-light-transmissive--.

COLUMN 6:

Line 54, "tile angle" should read --tilt angle--.

COLUMN 10:

Line 62, "details," should read --detail,--.

UNITED STATES PATENT AND TRADEMARK OFFICE
CERTIFICATE OF CORRECTION

PATENT NO. : 7,584,564 B2
APPLICATION NO. : 10/519748
DATED : September 8, 2009
INVENTOR(S) : Akihiro Matsuda et al.

It is certified that error appears in the above-identified patent and that said Letters Patent is hereby corrected as shown below:

<u>COLUMN 14</u>:

Line 30, "(a1," should read --(a11,--; and
Line 42, "factor YF" should read --factor $Y_F$--.

Signed and Sealed this

Seventeenth Day of November, 2009

David J. Kappos
*Director of the United States Patent and Trademark Office*